United States Patent
Okamoto et al.

(10) Patent No.: US 7,359,341 B2
(45) Date of Patent: Apr. 15, 2008

(54) RADIO COMMUNICATION SYSTEM

(75) Inventors: Naoki Okamoto, Chiba (JP); Norihiko Morinaga, Osaka (JP); Seiichi Sanpei, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 411 days.

(21) Appl. No.: 10/510,505

(22) PCT Filed: Feb. 25, 2003

(86) PCT No.: PCT/JP03/02059

§ 371 (c)(1),
(2), (4) Date: Oct. 7, 2004

(87) PCT Pub. No.: WO03/085867

PCT Pub. Date: Oct. 16, 2003

(65) Prior Publication Data

US 2005/0163067 A1  Jul. 28, 2005

(30) Foreign Application Priority Data

Apr. 8, 2002 (JP) .................. 2002-105245

(51) Int. Cl.
*H04B 7/00* (2006.01)
*H04B 1/00* (2006.01)

(52) U.S. Cl. ................ 370/310; 370/337; 370/347; 370/442

(58) Field of Classification Search ........ 370/321–324, 370/336–337, 347–348, 442–444, 280, 294, 370/208; 455/522, 69, 127.1; 375/260

See application file for complete search history.

(56) References Cited

U.S. PATENT DOCUMENTS

| | | | | |
|---|---|---|---|---|
| 5,940,006 A | * | 8/1999 | MacLellan et al. | 340/10.1 |
| 6,735,256 B1 | * | 5/2004 | Toshimitsu | 375/260 |
| 7,039,120 B1 | * | 5/2006 | Thoumy et al. | 375/275 |
| 7,126,996 B2 | * | 10/2006 | Classon et al. | 375/260 |
| 2001/0004389 A1 | | 6/2001 | Kimura et al. | |
| 2001/0040928 A1 | * | 11/2001 | Sakoda | 375/260 |

(Continued)

FOREIGN PATENT DOCUMENTS

EP  0930752 A2  7/1999

(Continued)

OTHER PUBLICATIONS

Hidemi Matsumura et al., The Institute of Electronics, Information and Communication Engineers, pp. 107-112.

*Primary Examiner*—Simon Nguyen
(74) *Attorney, Agent, or Firm*—Birch, Stewart, Kolasch & Birch, LLP

(57) ABSTRACT

A TDMA radio communication system uses a multiple sub-carrier modulation method. The TDMA radio communication system comprises at least a first and a second radio station. The second radio station selects only those sub-carriers capable of providing a transmission rate not less than a predetermined value in the first radio station, on the basis of the reception conditions of each sub-carrier of said first radio station. The second radio station then modulates the selected sub-carriers using a modulation level or a coding rate in accordance with the reception conditions of the sub-carriers so as to perform communication, thereby obtaining a desired transmission rate while controlling interface to other stations.

16 Claims, 12 Drawing Sheets

U.S. PATENT DOCUMENTS

| | | | |
|---|---|---|---|
| 2002/0159422 A1* | 10/2002 | Li et al. | 370/342 |
| 2003/0147655 A1* | 8/2003 | Shattil | 398/182 |
| 2006/0109932 A1* | 5/2006 | Bohnke et al. | 375/299 |
| 2006/0126493 A1* | 6/2006 | Hashem et al. | 370/208 |

FOREIGN PATENT DOCUMENTS

| | | |
|---|---|---|
| JP | 62-502932 A | 11/1987 |
| JP | 10-303849 A | 11/1998 |
| JP | 11-55210 A | 2/1999 |
| JP | 99/20027 A2 | 4/1999 |
| JP | 11-191794 A | 7/1999 |
| JP | 11-508417 A | 7/1999 |
| JP | 11-317723 A | 11/1999 |
| JP | 2000-69033 | 3/2000 |
| JP | 2000-286821 A | 10/2000 |
| JP | 2000-358008 A | 12/2000 |
| JP | 2001-251270 | 9/2001 |
| JP | 2001-520487 A | 10/2001 |
| JP | 2001-308746 A | 11/2001 |
| JP | 2001-320346 A | 11/2001 |
| JP | 2002-16577 A | 1/2002 |
| JP | 2002-504283 A | 2/2002 |
| WO | WO-86/07223 A1 | 12/1986 |
| WO | WO-97/01256 A1 | 1/1997 |
| WO | WO-98/57472 A1 | 12/1998 |

* cited by examiner

TRANSMISSION
SPECTRUM

RECEPTION
SPECTRUM

FIG. 4 A
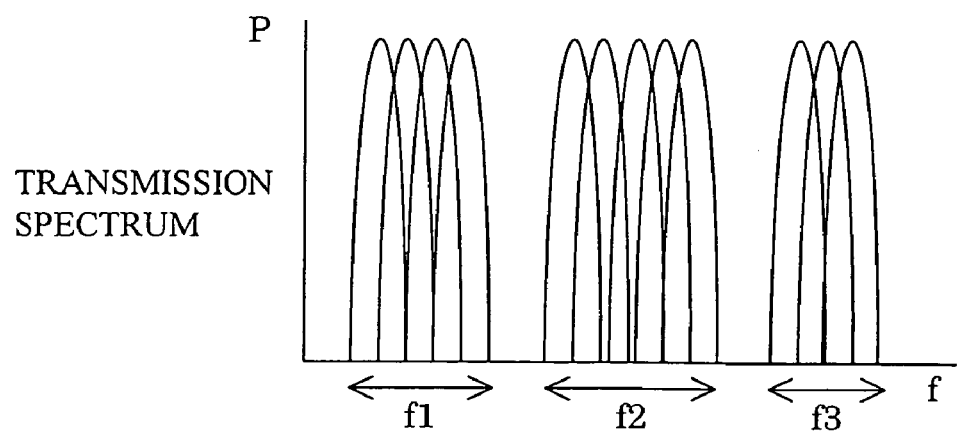
TRANSMISSION SPECTRUM
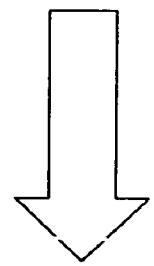
FIG. 4 B
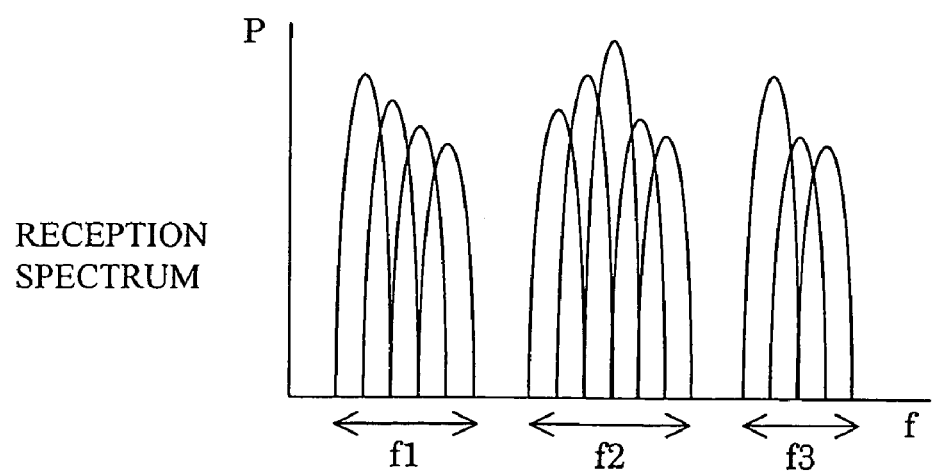
RECEPTION SPECTRUM FIG. 5 A
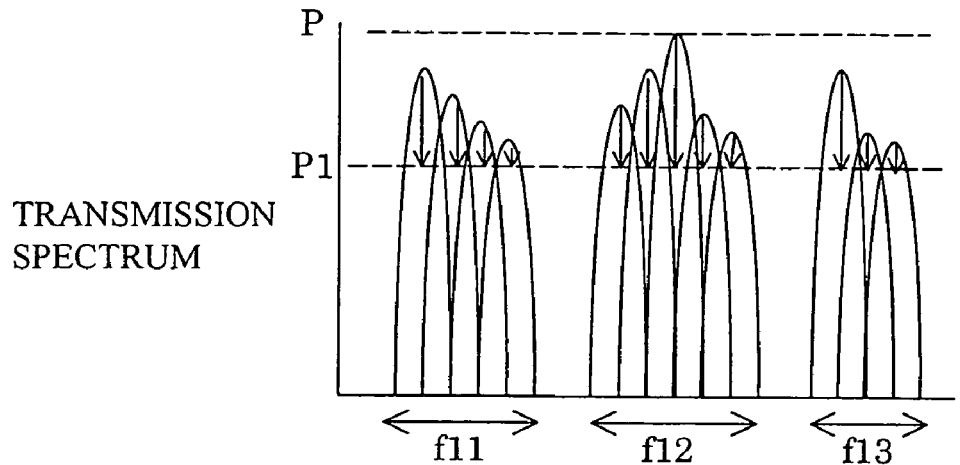
TRANSMISSION SPECTRUM
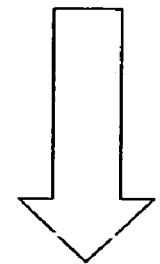
FIG. 5 B
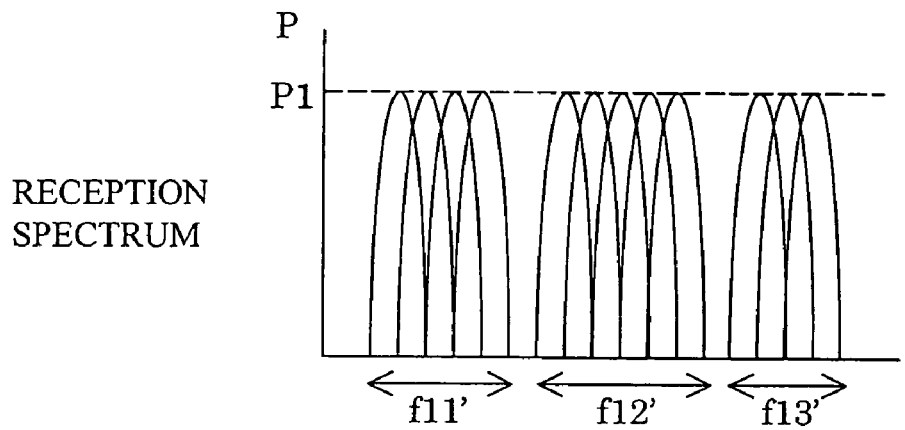
RECEPTION SPECTRUM FIG. 11 A    FDMA METHOD
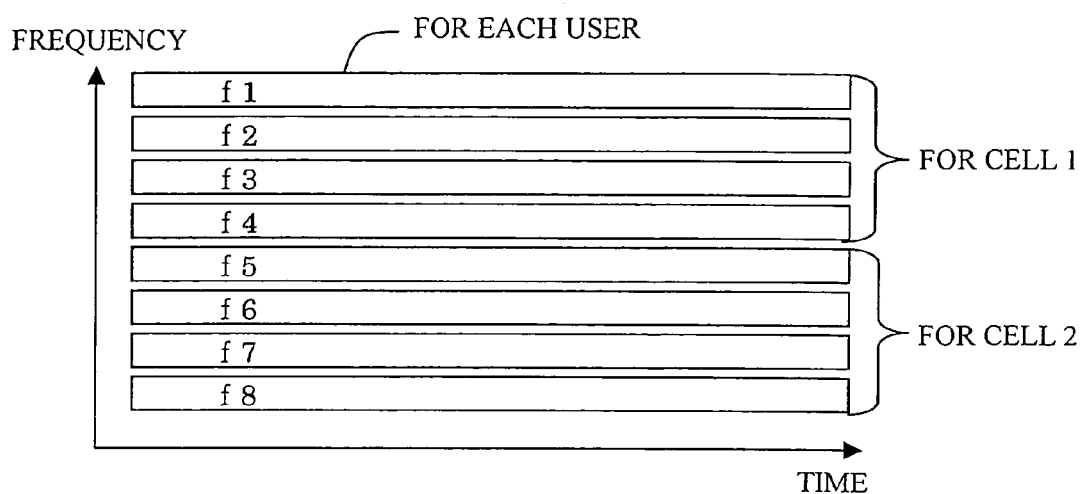
FIG. 11 B    TDMA METHOD
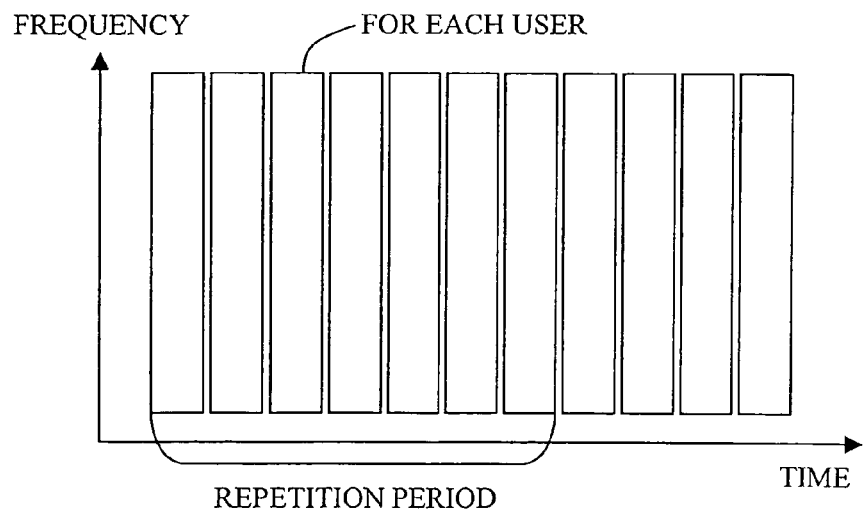

RADIO COMMUNICATION SYSTEM

TECHNICAL FIELD

The present invention relates to a radio communication system that enables fast and stable communication in a cellular system comprising a planar or linear service area that is divided into small cells, each cell including a base station that communicates with a terminal within the cell, wherein the same frequency is used in each cell.

BACKGROUND ART

In a radio system such as one for cellular phones, since it is necessary to cover a communication area in a planar manner and since the coverage of a radio wave is limited such that an entire service area cannot be covered by only a single base station, a plurality of base stations (access point: hereafter referred to as "access point AP") are disposed, so that communication is continuously possible even when a terminal station moves. For example, a system that has a configuration of cells as shown in FIG. 10 is used.

As shown in FIG. 10, a large number of substantially hexagonal cells 39 are disposed in the honeycomb structure in a plane and an access point AP 38 is positioned at the center of each cell 39. A terminal MT 40 existing within each cell 39 is controlled by the access point AP 38, and communication is performed between the terminals MT 40 through the access point AP 38.

In such a structure, in order to continuously provide services such as telephone service even when the terminal MT 40 moves, the cells 39 are disposed in an adjacent to partially overlapping manner. In this case, a different frequency is used for communication in each cell, so that a radio wave is prevented from causing interference in an adjoining cell. When the same frequency is used, the cells are spaced apart from one another by a distance corresponding to several cells so that an interference wave can be sufficiently attenuated. Such a system is referred to as FDMA (Frequency Division Multiple Access) and is used for PDC (Personal Digital Cellular), for example, which is a current digital cellular phone system.

However, in the aforementioned structure using the FDMA method, frequencies practically available in a single cell 39 is only a fraction of the frequencies allotted to the entire system. Therefore, there is a limit to the extent to which the line capacity that can be accommodated within the same cell can be increased.

In view of these facts, it has been proposed to configure cells according to the TDMA (Time Division Multiple Access) method using the same frequency. A method of sharing frequency and time in the TDMA method is explained with reference to FIG. 11. FIG. 11 shows time in the horizontal axis and frequency in the vertical axis. FIG. 11(A) pertains to the FDMA method and FIG. 11(B) shows the usage of frequency in the TDMA method.

As shown in FIG. 11(A), in the FDMA method, separate frequencies f1 to f8, for example, are allotted to the individual users. A user therefore occupies the same frequency on the time axis for communication. Since multiple users exist within a single cell, multiple frequency channels are allotted to each cell.

As shown in FIG. 11 (B), in the TDMA method, a single frequency band is used. The frequency band is divided into narrow slots (time slots), and users communicate by using any of the slots. However, in order to communicate continuously, it is necessary to allot the slots repeatedly to each user. Thus, the slots are allotted to the users at periodic intervals with a repetition period as one cycle shown in the figure.

In the TDMA method, the method of using the time slots in case where there are more than one access point AP, such as access point AP 1 and access point AP 2, for example, is explained with reference to FIG. 12. FIG. 12 shows a system having eight time slots TS 1 to 8.

It is assumed that the two access points AP 1 and AP 2 operate according to a TDMA radio communication method and that the access points use the same number of time slots (repetition period) and the same time slot time (time width of a single time slot). In addition, the time slot time is assumed to be synchronized.

In FIG. 12, between a first access point AP 1 and a terminal (MT, not shown in the figure), a second time slot TS 2 is used for communication. Therefore, seven time slots, namely, TS 1 and TS 3 to TS 8 are vacant. Since interference increases if communication is carried out between a second access point AP 2 and the terminal in the time slot TS 2, they communicate using any one of the seven time slots TS 1 and TS 3 to TS 8. In this way, the same frequency can be shared between different access points AP by dividing it in the time domain.

Moreover, in the Frequency Division Multiple Access (FDMA) method, on account of the limitations of analog circuits such as filters, it is difficult to change the frequency width freely. However, in the TDMA method, there are less circuit limitations because the frequency is divided into slots on the time axis. Therefore, single terminal can use not one but two or three time slots. In this case, the communication capacity can be doubled or tripled, and the bandwidth can be freely controlled for multimedia communication. The TDMA method is thus a communication method also advantageous to packet data communication, for example, wherein the transmission capacity constantly varies.

Power control is an additional technology to realize a radio communication system based on the TDMA method. It is possible that terminals exist from the center of a cell to the edge thereof (cell edge). Because of the characteristics of a radio wave, the attenuation of propagation is low between the access point and a terminal at the center of the cell, while the attenuation is high in the communication with a terminal at the cell edge.

Since the quality that is required for communication is fixed, it is not necessary to have the same transmission level. The emission of unnecessary radio wave can be reduced by lowering the transmission power at the center of the cell and raising the transmission power at the cell edge, for example, thereby maintaining a constant signal power. When the cells are configured in such a method, interference can be reduced not only between adjoining cells for which measures are generally taken against the effects of interference, but also for cells that adjoin the adjoining cells.

DISCLOSURE OF THE INVENTION

In a case where cells are configured in a system as mentioned above, the number of time slots as a minimum unit and power control substantially affect the number of terminals (MT) that can be accommodated within the cells.

In a case where the cells are configured using the same frequency, the magnitude of interference from other stations determines the number of terminals that can be accommodated because the access points AP share the frequency.

Especially, by performing the aforementioned power control as aforementioned, radiation from a terminal MT at the center of a cell can be reduced. A terminal at the cell edge can be provided with a required reception power. However, the higher the electric power is raised in the terminal at the cell edge, the greater the interference with other cells would be.

In order to solve the problem, it is necessary to minimize interference as mush as possible. However, since attenuation due to propagation is physically determined, there is a tradeoff between performing stable reception and the minimization of interference. In addition, if the interference is large, especially when interference power that exceeds an allowable power is in all the time slots, signal waves between the access point AP and the terminals MT would be in a busy status, causing a problem that communication cannot be established.

It is an object of the present invention to provide a TDMA radio communication technology that ensures stable communication (reception) while reducing interference.

As one aspect of the present invention, the present invention provides a TDMA radio communication system using a multiple sub-carrier modulation method. The TDMA radio communication system comprises at least a first and a second radio station. The second radio station selects only those sub-carriers capable of providing a transmission rate not less than a predetermined value in the first radio station, on the basis of the reception conditions of each sub-carrier of the first radio station. The second radio station then modulates the selected sub-carriers using a modulation level or a coding rate in accordance with the reception conditions of the sub-carriers so as to perform communication.

The present invention also provides a TDMA radio communication system using a multiple sub-carrier modulation method. The TDMA radio communication system comprises at least a first and a second radio station. The first radio station comprises: sub-carrier electric power detecting means for detecting the reception power of each sub-carrier; and notification means for notifying the second radio station of information on the reception power detected by the sub-carrier electric power detecting means. The second radio station comprises: determination means for determining whether a sub-carrier is capable of providing such a reception power as to enable communication at a transmission rate not less than a predetermined value in the first radio station, on the basis of the reception conditions of each sub-carrier sent from the first radio station; and transmission sub-carriers selecting means for selecting only those sub-carriers determined to be capable of enabling communication by the determination means. The sub-carriers selected by the transmission sub-carriers selecting means are modulated using a modulation level or a coding rate in accordance with the reception condition of the sub-carriers in order to perform communication.

In the aforementioned TDMA radio communication system, the effect of interference can be reduced while ensuring the reception power, by not transmitting those sub-carriers that do not provide such a reception power as to enable communication at a transmission rate not less than a predetermined value in the first radio station, and by transmitting only those sub-carriers capable of enabling communication using a modulation level or a coding rate in accordance with the reception conditions of the sub-carriers.

The present invention further provides a TDMA radio communication system using a multiple sub-carrier modulation method. The TDMA radio communication system comprises at least one base station and a terminal station that share the same frequency to perform communication. The terminal station comprises: notification means for notifying the base station of broadcast information on the reception power of sub-carriers. The base station comprises: broadcast information detecting means for detecting the broadcast information; sub-carrier electric power detecting means for detecting the reception power of each sub-carrier in accordance with the broadcast information; determination means for determining whether a sub-carrier is capable of providing such a reception power as to enable communication at a transmission rate not less than a predetermined value in the terminal station, on the basis of the reception power detected by the sub-carrier electric power detecting means; and transmission sub-carrier selecting means for selecting only those sub-carriers determined to be capable of enabling communication by the determination means. Each sub-carriers selected by the transmission sub-carrier selecting means are modulated using a modulation level or a coding rate in accordance with the reception power in order to perform communication.

According to the aforementioned TDMA radio communication system, the terminal station is not required to detect the reception power of each sub-carrier, but the base station may detect the reception power.

In another aspect, the present invention provides a TDMA radio communication system using a multiple sub-carrier modulation method. The TDMA radio communication system comprises at least one base station and a terminal station. The base station selects only those sub-carriers capable of providing such a transmission rate not less than a predetermined value in the terminal station, on the basis of the reception conditions of each sub-carrier of the terminal station, and modulates the selected sub-carriers using a modulation level or a coding rate allotted in accordance with the reception conditions of the selected sub-carriers and the position of the terminal station with respect to the base station so as to perform communication.

According to the aforementioned TDMA radio communication system, an good radio communication can be performed while controlling interference by maintaining a balance between the reception power that varies depending on the position of the terminal station and interference power.

The present invention also provides a TDMA radio communication system using a multiple sub-carrier modulation method. The TDMA radio communication system comprises at least one base station and a terminal station. The terminal station comprises: sub-carrier electric power detecting means for detecting the reception power of each sub-carrier; and notification means for notifying the base station of information on the reception power detected by the sub-carrier electric power detecting means. The base station comprises: determination means for determining whether a sub-carrier is capable of providing such a reception power as to enable communication at a transmission rate not less than a predetermined value in the terminal station, on the basis of the reception conditions of each sub-carrier sent from the first terminal station; allotment means for allotting a modulation level or a coding rate in accordance with the reception conditions and the position of the terminal station with respect to the base station; and transmission sub-carrier selecting means for selecting only those sub-carriers determined to be capable of enabling communication by the determination means, the sub-carriers being transmitted using a modulation level or a coding rate allotted by the allotment means.

By allotting the modulation level or coding rate in accordance with the reception condition and the position of the terminal station with respect to the base station, the reception power/interference ratio can be larger.

Preferably, the transmission rate not less than a predetermined value is the maximum transmission rate. By setting the transmission rate such that the maximum transmission rate can be obtained, the maximum capacity of the radio communication system can be obtained. The maximum transmission rate that can be demodulated may be detected by either side of the radio stations such as the base station, for example.

In the aforementioned solution, each element such as the first radio station and the second radio station or the base station and the terminal station, may independently exist. Such a case is included in the present invention.

BRIEF DESCRIPTION OF THE DRAWINGS

FIGS. 4(A) and (B) show the electric power spectra of sub-carriers warped under the influence of fading, for example, according to an embodiment of the radio communication system of the present invention. FIG. 4(A) shows the transmission spectrum and FIG. 4(B) shows the reception spectrum.

FIG. 5(A) shows the transmission spectrum shown in FIG. 4(B) being adjusted to a predetermined reception power P1. FIG. 5(B) shows the reception spectrum after being adjusted.

FIG. 11(A) shows the usage of frequency in the FDMA method. FIG. 11(B) shows the usage of frequency in the TDMA method.

BEST MODE FOR CARRYING-OUT OF THE INVENTION

As in a general TDMA radio communication system, the TDMA radio communication system of the present specification comprises cells, each including at least one access point and a terminal, that form a service area.

Before the explanation of the embodiments of the present invention, a study carried out by the inventors is explained with reference to the drawings.

Figure 1:
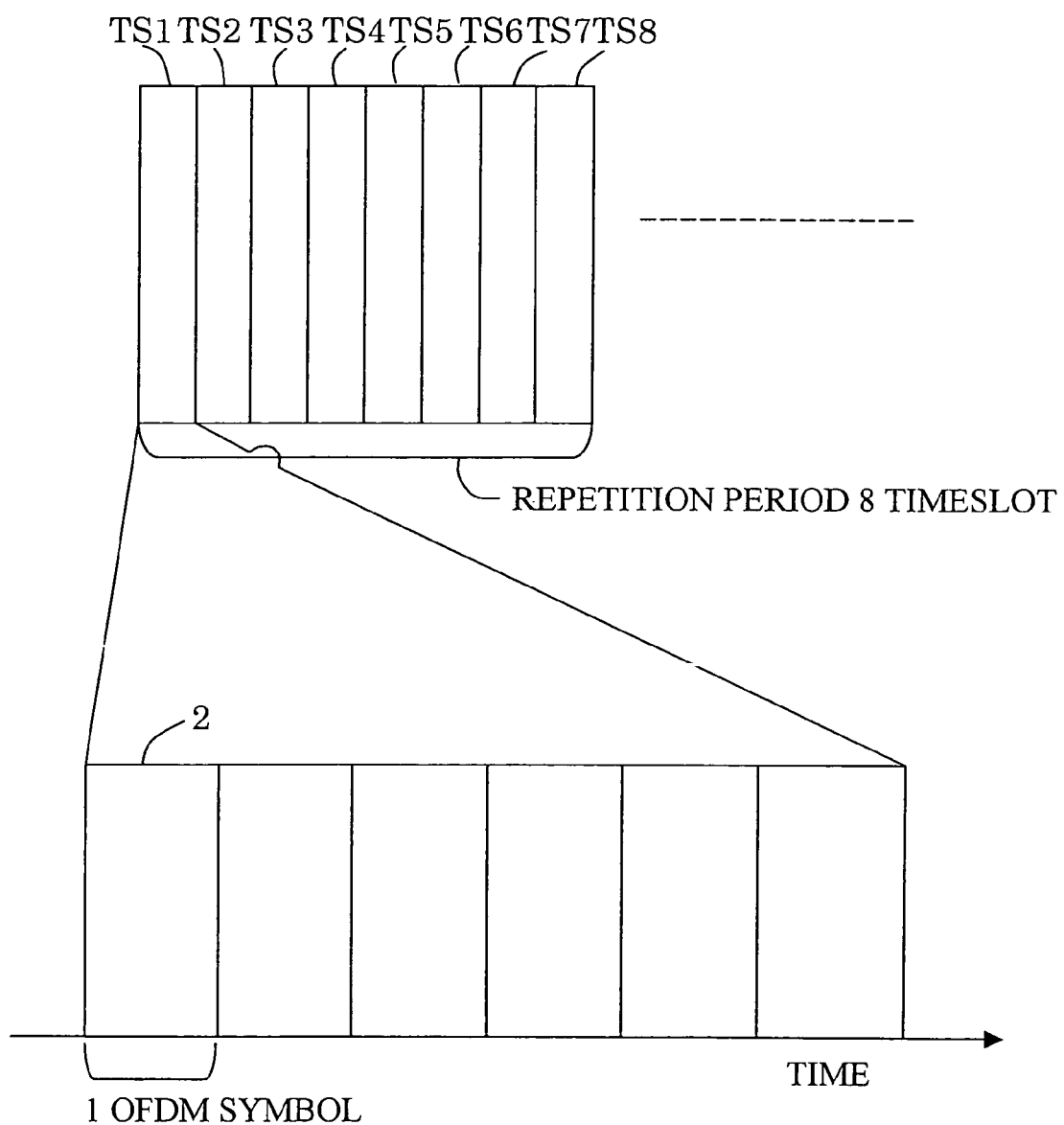
FIG. 1 shows the allotment of time slots in the TDMA-OFDM method according to an embodiment of the radio communication system of the invention.

In a TDMA radio communication system that uses one-cell reuse, as shown in FIG. 1, the time width of each time slot is an integer multiple of the time width of an OFDM (Orthogonal Frequency Division Multiplexing) slot. The OFDM slot is a minimum constituent unit of OFDM and has a time width determined by the transmission speed of an OFDM signal composed of multiple (from dozens to thousands) sub-carriers and the time corresponding to a guard interval.

As shown in FIG. 1, the frequency is divided into multiple time slots TS 1 to 8, for example, in accordance with the TDMA method. Moreover, each time slot TM is composed of multiple (6 in FIG. 1) OFDM symbols 2. Namely, the time width of time slot TS is set to be an integer multiple (6 in this case) of the time width of the OFDM symbol.

A OFDM signal is described in the following. The OFDM signal is composed of multiple modulating signals called sub-carriers. Since each sub-carrier transmits an independent signal orthogonally, there is no correlation among sub-carriers and each sub-carrier can be treated independently.

Figure 2:
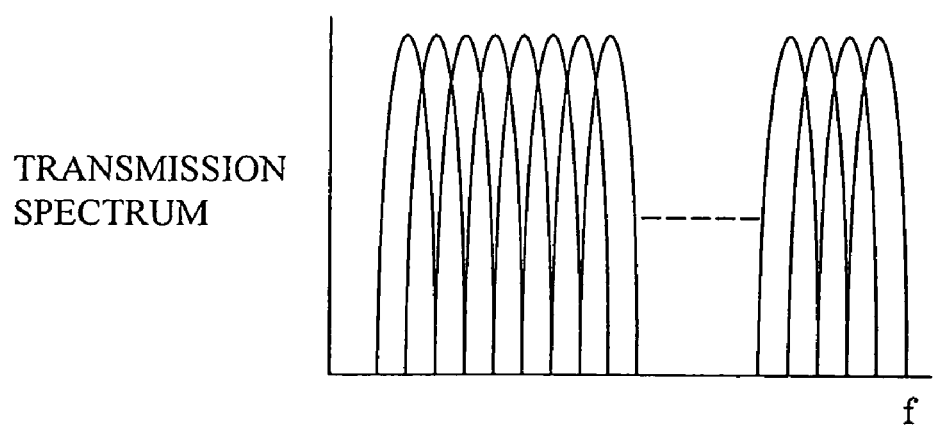
FIGS. 2(A) and (B) show the electric power spectra of sub-carriers warped under the influence of fading, for example, according to an embodiment of the radio communication system of the invention.
Figure 2:
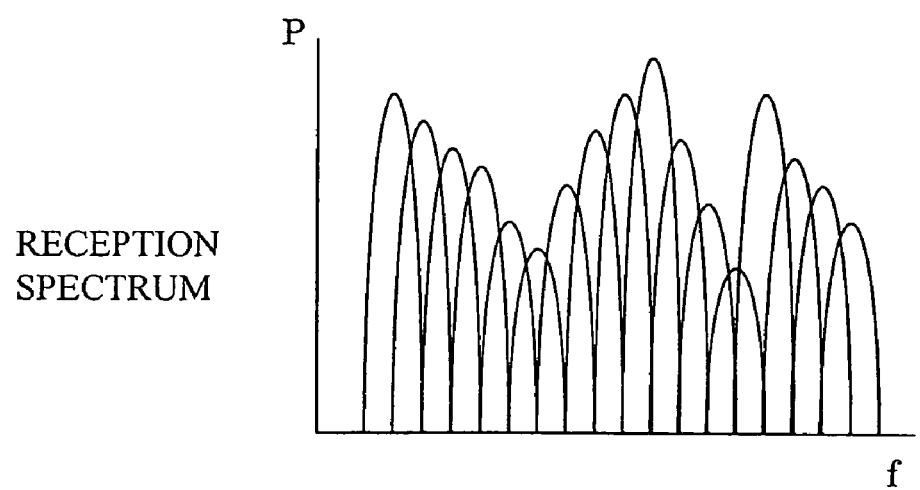

FIG. 2 shows signal spectra designating frequency on the horizontal axis and electric power on the vertical axis. As shown in FIG. 2(A), a transmission signal modulated by the OFDM method indicates no frequency dependence in the maximum electric power. In contrast, as shown in FIG. 2(B), the reception power indicates frequency dependence in the maximum electric power under the influence of reflected waves, for example, in a propagation path. As shown in FIG. 2(B), a phenomenon in which each frequency is affected differently is called a frequency-selective fading phenomenon. When a signal is affected by the frequency-selective fading, a sub-carrier whose reception power is lowered has a smaller reception signal to noise ratio (C/N), and errors increase. However, since each sub-carrier is in the orthogonal and independent relationship, signals on sub-carriers with large C/N are not affected.

In addition, because each sub-carrier is in the orthogonal relationship, it is possible to apply a different modulation method to each sub-carrier. For example, it is possible to apply modulation methods with a different modulation level, such as BPSK (Binary Phase Shift Keying), QPSK, 16QAM, and 64QAM to individual sub-carriers.

In a general adaptive modulation system, communication is performed using 64QAM for a high-C/N while using BPSK for a low-C/N, for example, in order to achieve a stable communication under the frequency-selective fading.

The inventors have arrived at the technology using a TDMA-OFDM radio communication method wherein the reception power of each sub-carrier is calculated from a received signal, and wherein, for frequencies (frequency band) with a large reception power, transmission is carried out by a modulation method with a large number of multiple values that enables time slots to carry a lot of information, while carrying out no transmission for frequencies (frequency band) with a small reception power.

On the basis of the aforementioned analysis, embodiments of the radio communication system according to the present invention are described below with reference to the drawings.

Figure 3:
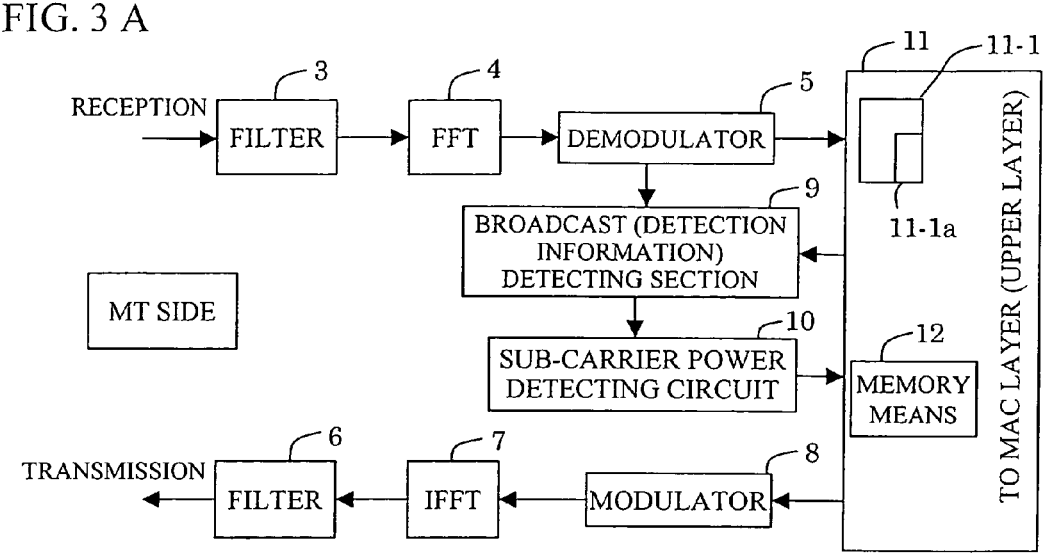
FIG. 3(A) shows a functional block diagram of a terminal according to an embodiment of the radio communication system of the invention.
FIG. 3(B) shows a functional block diagram of an access point according to an embodiment of the radio communication system of the invention.
FIG. 3(C) shows a repetition period of signals including a broadcast packet.
Figure 3:
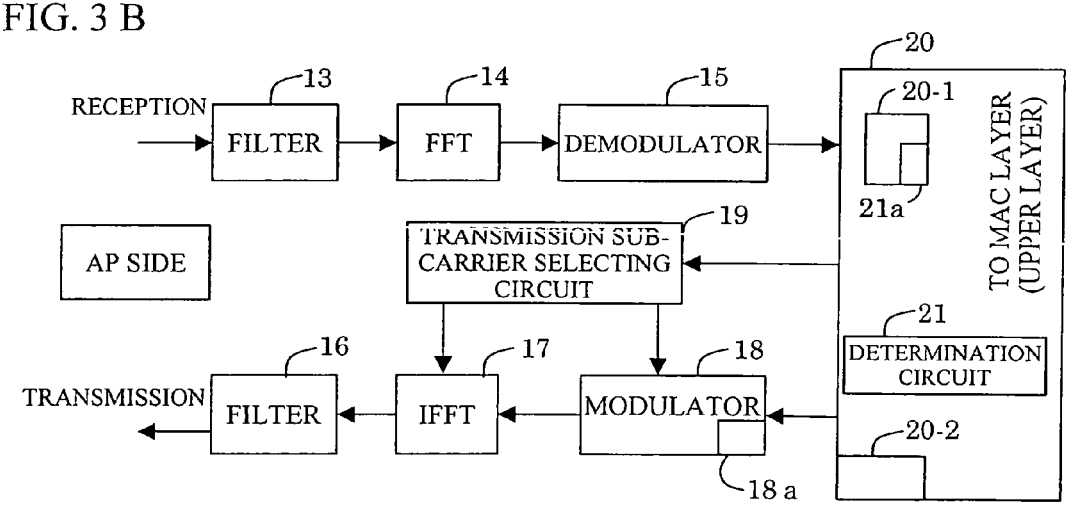
Figure 3:
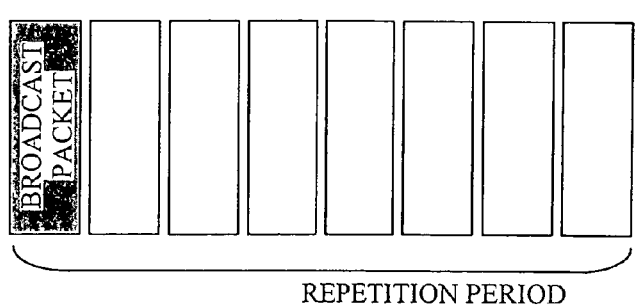

FIG. 3 shows a functional block diagram of an example of the radio communication system according to a first embodiment of the invention. FIG. 3(A) shows an example of a terminal and FIG. 3(B) shows an example of an access point AP. FIG. 3(C) is a conceptual diagram of the structure of a repetition period in time slots.

As shown in FIG. 3(A), the terminal MT comprises, in order from the reception side to the transmission side, a reception-side filter 3, an FFT 4, a demodulator 5, a MAC layer 11, a modulator 8, an IFFT 7, and a transmission-side filter 6. In addition, the terminal MT according to the present embodiment comprises a broadcast (detection information) detecting section 9, a sub-carrier power detecting circuit 10, and a MAC layer (upper layer) 11. The MAC layer 11 includes a memory means 12 and a timing extracting circuit 11-1. The timing extracting circuit 11-1 comprises a delay time measuring circuit 11-1a.

As shown in FIG. 3(B), the access point AP comprises, in order from the reception side to the transmission side, a reception-side filter 13, an FFT 14, a demodulator 15, a MAC layer 20, a modulator 18, an IFFT 17, and a transmission-side filter 16. In addition, the access point AP according to the present embodiment comprises a transmission sub-carrier selecting circuit 19 and a MAC layer 20. The MAC layer 20 comprises a determination circuit 21, a timing extracting circuit 20-1, and a calculation means 20-2. The timing extracting circuit 20-1 comprises a delay time measuring circuit 21a.

When the terminal MT enters a cell that includes a certain access point AP, information is exchanged between the access point AP and the terminal MT at least once, and then, the ID and functions, for example, of the terminal MT are registered with the access point AP.

Then the access point AP, as shown in FIG. 3(C), periodically transmits a broadcast signal (packet) using one of the time slots. The broadcast packet is intended to be broadcast for all terminals. It is a signal to be received commonly by each terminal MT and is transmitted using a most reliable modulation method. For example, the broadcast packet includes the identification number of the access point AP and information on supported systems.

On the receiving terminal end, the broadcast signal (packet) is distinguished from normal data signals in the broadcast detecting section 9 on the basis of the difference in data format, for example, and this fact is notified to the MAC layer 11. In the sub-carrier power detecting circuit 10, the electric power of each sub-carrier is measured and this information is notified to an upper layer not lower than the MAC layer where information on the identification number and the electric power of the sub-carrier, for example, is stored in the memory means 12 in a table format, for example. The memory information is notified to the access point AP as transmission information.

The access point AP receives the signal transmitted from the terminal MT that entered its cell and, from the received signal, recognizes the reception power of each sub-carrier of the terminal MT in the MAC layer 20. Based on the result, the determination circuit 21 determines whether the sub-carrier is capable of providing such a reception power as to enable communication at a transmission rate not less than a predetermined value supported by the terminal MT, such as a maximum transmission rate. Only a sub-carrier determined to be capable of such communication is selected (on/off) by the transmission sub-carrier selecting circuit 19 and transmission is performed.

The delay time measuring circuits 11-1a and 21a measure or estimate the distance between the access point AP and the terminal MT by measuring delay time in the signal exchange between the access point AP and the terminal MT as described later.

The calculation circuit 20-2 calculates a transmission rate in each position such that interference power to adjoining cells is not more than a predetermined value as described later.

As shown in FIG. 2, although all the sub-carriers are transmitted with the same electric power on the transmission side, fading occurs due to the positional relationship of the reception system, resulting in the presence of some sub-carriers with higher reception power and others with lower reception power. In this case, when trying to communicate without errors using all the sub-carriers, for example, the aforementioned adaptive modulation method is employed, for example, whereby, sub-carriers with good reception conditions are transmitted with a high modulation level signal such as 64QAM and sub-carriers with bad reception conditions are transmitted with a low modulation level signal such as BPSK, for example.

Although the sub-carriers with bad reception conditions are sub-carriers of low reception power for the terminal, this is caused by a large amount of loss in the propagation path, and the transmission signals per se are equally output as shown in FIG. 2(A). Therefore, it is not that low-level interference signals are sent to other terminals or cells. On the contrary, the level of the interference signals might increase in some cases. Namely, the average interference signal strength of all of the sub-carriers is statistically the same.

Accordingly, while the transmittable signals per se are reduced to a fraction of the entire signals because BPSK, for example, is used (one sixth; i.e., one bit in BPSK against six bits in 64QAM), interference to other stations is presumed to remain the same. Thus, the amount of interference noise to other terminals MT per bit would increase several times.

In contrast, by using the radio communication system according to the embodiments, sub-carriers with poor propagation conditions (i.e., small reception power) are not transmitted, so that the interference level per bit can be minimized.

Thus, in a TDMA-OFDM radio communication system, the amount of interference to other stations per bit of transmission can be minimized by making the time slots an integer multiple of an OFDM slot and by controlling the sub-carriers that are transmitted.

FIG. 4(A) shows a transmission signal spectrum and FIG. 4(B) shows a reception signal spectrum. FIG. 4(A) corresponds to FIG. 2(A) and FIG. 4 (B) corresponds to FIG. 2(B). From FIG. 2(A) and FIG. 2(B), of all the sub-carriers, transmission is performed in the frequency bands f1, f2, and f3, using only those sub-carriers with which such a reception power can be obtained that communication can be performed at the maximum transmission rate supported by the terminal MT as shown in FIG. 4(A), and transmission is not performed in other frequency bands. Consequently, the reception power not less than a predetermined value can be obtained in the reception spectrum as shown in FIG. 4(B).

It may seem that the transmission volume is decreases when the immediate station is considered alone. However, in terms of the entire radio communication system comprising a planar cell configuration, since the throughput of the entire radio communication system is determined by the total amount of interference, the throughput of the entire radio communication system can be improved by minimizing interference upon transmission of one bit, thereby improving the communication traffic.

In the conventional TDMA radio communication system, based on a single-carrier method which is different from the OFDM method, it is impossible to switch on/off the transmission depending on propagation characteristics because changing the degree of modulation which is possible, makes it impossible for the immediate station to communicate. By contrast, in the radio communication system according to the present embodiment, the independence of sub-carriers can be maintained as a result of processing at the FFTs 4 and 14 in FIG. 3, for example. Therefore, it is possible to switch on/off the transmission depending on the propagation characteristics using the transmission sub-carrier selecting circuit 19, for example, so that the efficiency of communication can be improved.

The radio communication system according to a second embodiment of the invention is described with reference to the drawings. In the first embodiment of the invention, transmission is performed after selecting only those sub-carriers capable of transmission in multiple values at a received level. In the present embodiment, power control is performed in each sub-carrier.

In the radio communication system according to the first embodiment of the invention, when the reception power of the selected sub-carriers are considered, there are cases where a sub-carrier with a minimum reception power represents the minimum power (minimum required power) necessary for multiple-value modulation, while the other sub-carriers have excessive reception power. In the radio communication system according to the present embodiment, the transmission power is controlled such that the reception power on the reception side can be the minimum required electric power.

Concretely, the electric power of sub-carriers in a broadband is measured in the sub-carrier power detecting circuit 10 shown in FIG. 3. Any sub-carrier whose electric power is not more than the required power is excluded from the objects of transmission. Sub-carriers whose electric power exceeds the required power are treated so that their output is lowered to the required power. To be more specific, the amplitude of reception power in each sub-carrier is adjusted to a desired amplitude in the output adjusting circuit 18a disposed in the modulator 18 shown in FIG. 3.

In practice, a specified margin is necessary to absorb the difference between transmission and reception systems, for example. Therefore, it is preferable to set the amplitude such that it is within the electric power range of the required power to which the system margin at the time of system design is added.

FIGS. 5(A) and (B) show thus-controlled transmission spectrum and reception spectrum.

As shown in FIG. 5(A), the reception power of each sub-carrier is lowered to the required power P1 as indicated by the arrows in the frequency bands for transmission f11, f12, and f13. Therefore, on the reception side, the sub-carriers are received with substantially the same reception level, and the sub-carriers in frequency bands other than the frequency bands f11', f12', and f13' are not transmitted and received. Consequently, the required power can be lowered in the radio communication system according to the first embodiment of the present invention, so that the effect of interference can be further reduced.

In the radio communication system according to the second embodiment of the present invention, in view of the margin of the radio communication system, any sub-carrier with which only a reception power not more than the required power can be obtained is excluded from the objects of transmission. However, in practice, sub-carriers slightly short of reception power may be transmitted by raising power a little. In this manner, the efficiency of transmission might improve in some cases. Especially, in the case of a radio communication system that has a sufficient transmission capability (maximum output capability), the electric power of sub-carriers may be raised. In this cases, the adjusting circuit 18a in FIG. 3 (B) may also be used, for example.

Figure 6:
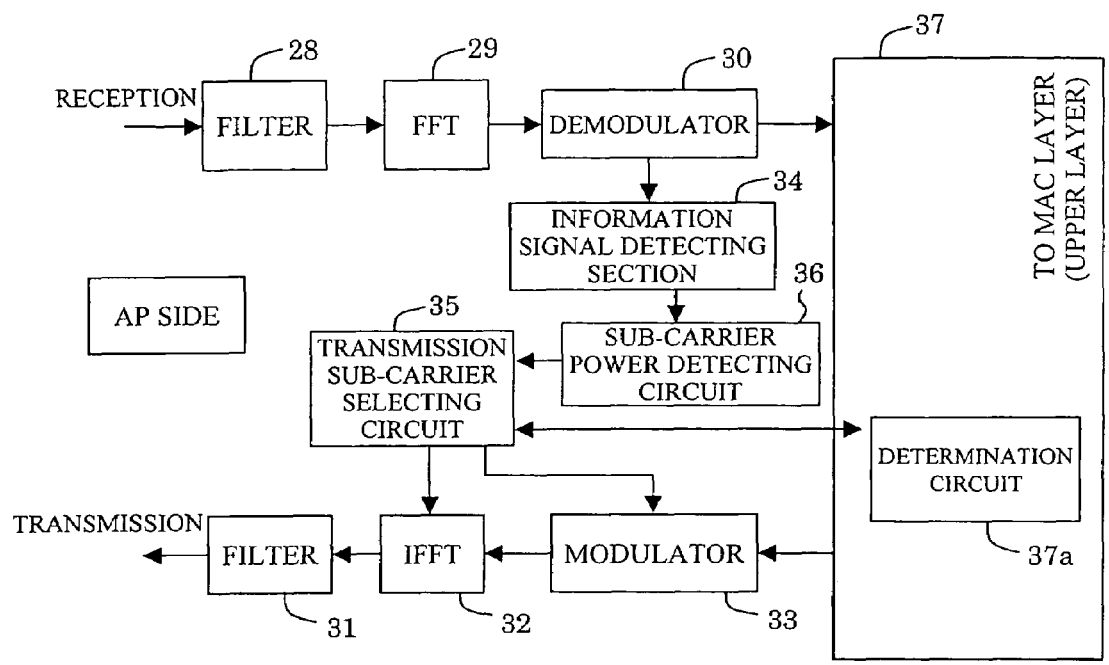
FIG. 6(A) shows a functional block diagram of an access point according to another embodiment of the radio communication system of the invention.
FIG. 6(B) shows a repetition period of signals including an information signal.
Figure 6:
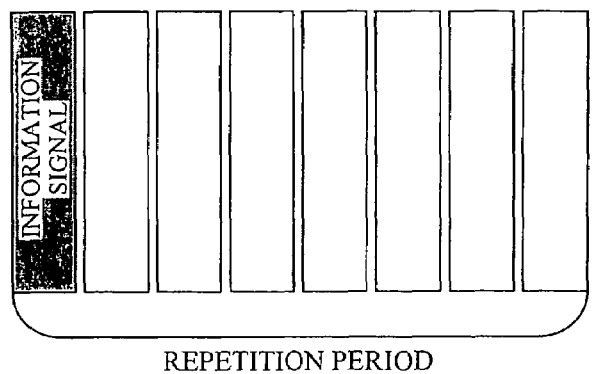

The following describes a radio communication system according to a third embodiment of the present invention with reference to FIG. 6. The radio communication system according to the present embodiment is applied to TDD (Time Division Duplex) system as an example.

As shown in FIG. 6(A), the radio communication system according to the present embodiment (access point AP) comprises, in order from the reception side to the transmission side, a reception-side filter 28, an FFT 29, a demodulator 30, a MAC layer 37, a modulator 33, an IFFT 32, and a transmission-side filter 31. In addition, the access point AP according to the present embodiment comprises an information signal detecting section 34, a sub-carrier power detecting circuit 36, and a transmission sub-carrier selecting circuit 35. A determination circuit 37a functions in the same manner as the determination circuit 21 in FIG. 3(B).

As shown in FIG. 6(B), the access point AP periodically transmits an information signal using one of the time slots. The information signal is intended to be broadcast for all terminals. It is a signal received commonly by each terminal MT and is transmitted in a most reliable modulation method.

The access point AP receives the information signal and the like from the terminal MT. From the received signal, the sub-carrier power detecting circuit 36 for measuring electric power measures the signal power of each sub-carrier and notifies the MAC layer 37. The information signal is transmitted using all the sub-carriers, for example, with the same output power by a modulation method common to all the sub-carriers such as the BPSK method.

The access point AP determines the sub-carriers it is to transmit based on the information signal, and then selects the sub-carriers to be modulated and inverse Fourier transformed in the transmission sub-carrier selecting circuit 35. In this case, communication is performed using only those sub-carriers with which data can be reliably transmitted by multiple-value modulation.

In the TDD system, the propagation characteristics received by the access point AP and those to the terminal MT are practically the same. Therefore, sub-carriers to be used can be selected only on the access point AP side without making measurements on the terminal MT side and notifying the access point AP of the result. Namely, in the TDD system, in contrast to other systems, communication frequencies are the same for the uplink and the downlink in communication between the access point AP and the terminal MT. In a system other than the TDD system, the access point AP is required to receive information on the reception power of each sub-carrier from the terminal MT. By contrast, in the TDD system, the access point AP is not required to detect information on the terminal MT.

Therefore, it is not necessary to measure sub-carrier signals on the terminal MT side, for example, leading to the advantage that the terminal can be downsized and its price can be reduced.

In the following, a radio communication system according to a fourth embodiment of the present invention is described with reference to the drawings.

In the radio communication system according to the first to the third embodiments as described above, transmission is controlled in order to maximize the transmission rate of sub-carriers.

With regard to a terminal at a cell edge, interference with adjoining cells becomes greater when the electric power from the terminal is increased since the distance to other cells is small. Therefore, in order to lower the electric power intentionally with regard to the terminal at the cell edge, it is preferable to select a modulation rate such that the C/N is small. As the electric power necessary for reception differs depending on systems, it is not possible to define an absolute value. However, the electric power necessary for the 64QAM demodulation and the electric power necessary for the QPSK demodulation, for example, may differ by more than 10 times.

In an over the horizon communication where, shadows of a signal are produced by obstacles, for example, the strength of the signal is attenuated by the distance to the power of 2.5 to 3. When a terminal MT close to an access point AP sends a signal, little problems would be caused since the strength of the signal that reaches adjoining cells would be reduced to a fraction. However, a terminal MT at a cell edge tends to be a source of interference since it is close to the adjoining cells.

Also, with regard to the terminal MT at the cell edge, as the distance to the access point AP is long, the output must be inevitably increased if the same required power is to be received by the access point AP.

Therefore, it is preferable to control output on the basis of a modulation method such as 64QAM when the terminal MT is near the center of the cell or QPSK when the terminal MT is at the cell edge.

An example of a specific controlling method is described with reference to FIG. 7.

In this control example, as a criterion for control, control is carried out such that interference power at an adjoining access point AP can be a predetermined value or less.

Figure 7:
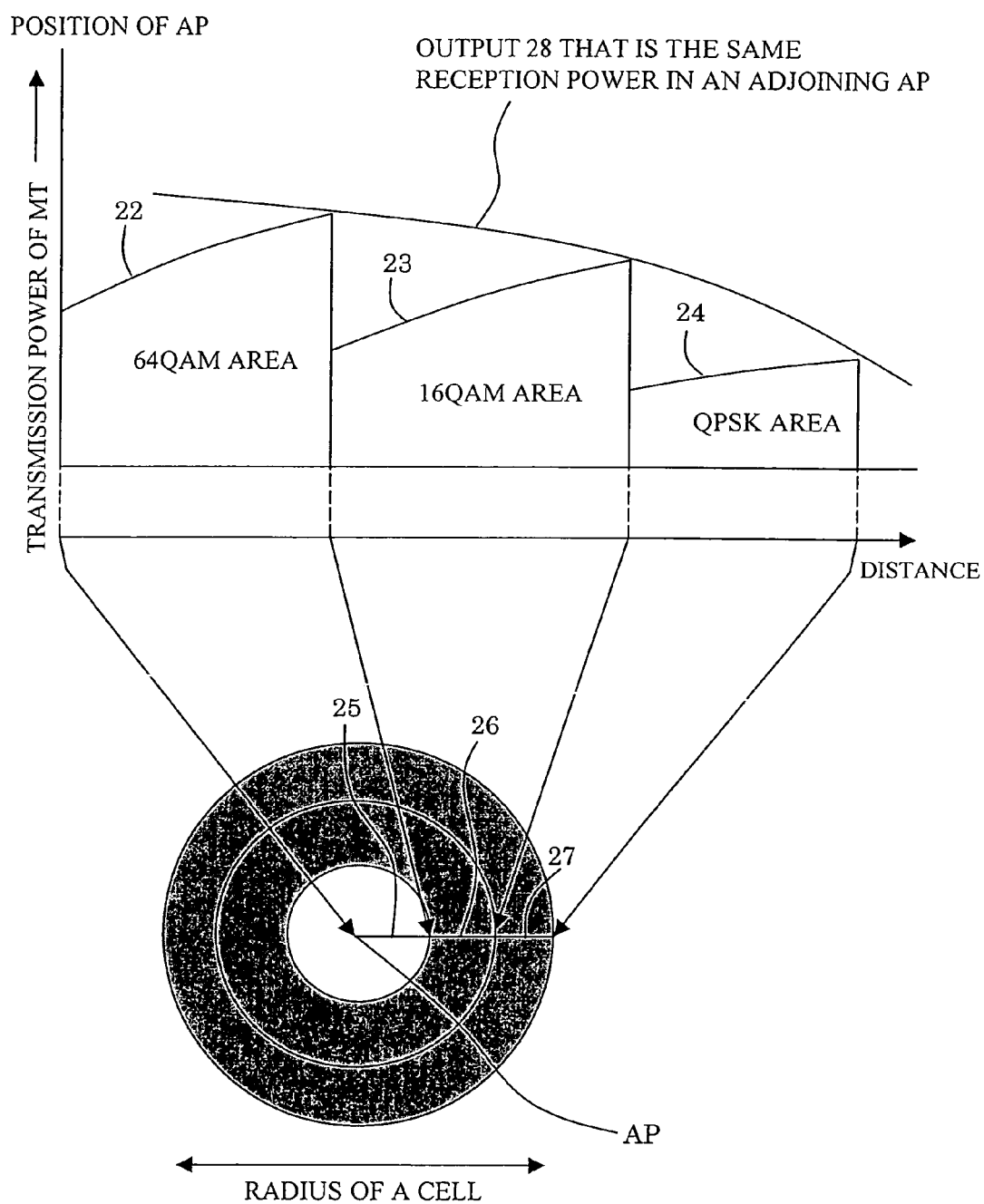
FIG. 7 shows the control of an access point using the TDD method according to an embodiment of the radio communication system of the invention.

As shown by the numeral 21 in FIG. 7, interference received by the adjoining access point AP is attenuated by the distance to the power of 2.5 to 3.5. In proportion as a terminal comes close to the access point AP, the effect of interference decreases and signal output can be sent instead.

In contrast, when 64QAM transmission is considered, when the terminal is close to the access point AP, attenuation is small even if electric power is low, while required output increases in proportion to the distance from the access point AP since the attenuation increases. The numeral 22 of the drawing shows a curve of distance-dependent output necessary for the terminal MT. With the distance from the access point AP, required transmission power increases. The distance (area) to the point of intersection of the curve 22 and the upper limit curve 28 determined by limitation of interference is an area available for communication by 64QAM (the lightest-colored area 25 within the circle in the drawing).

The next area is a 16QAM area wherein the reception power at the access point AP may be low. In this case, an area available for communication by 16QAM can be determined likewise (the middle-colored area 26 within the circle in the drawing). Also, an area for communication by QPSK can be determined (the deepest-colored area 27 within the circle in the drawing).

As mentioned above, zones are delimited in a cell in accordance with modulation rates. By performing such control in each sub-carrier unit, a maximum transmission rate can be ensured for output allowed to each sub-carrier.

As a result, necessary communication can be performed while controlling interference to other cells, thereby improving the entire throughput.

As a method for detecting a terminal position, a method for using delay of a received electric wave and a method for obtaining the position on the basis of an average of reception power can be used. Namely, in the TDMA radio communication system, since the access point AP manages slots, a signal is returned fast from a close terminal, while a signal is returned late from a distant terminal on account of the effect of delay getting greater. Therefore, the position of the terminal in a cell can be detected on the basis of this time, so that in which of the zones the terminal exists can be known.

As shown in FIG. 3, in the timing detecting circuit 11-1, the delay time measuring circuits 11-1a, and 21a, an average signal delay time is determined by sampling a signal exchange between the access point AP and the terminal MT for a relatively long time. Based on the result, the distance between the access point AP and the terminal MT can be measured or estimated.

In contrast, in the aforementioned OFDM method, each sub-carrier per se is in the independent relationship from other sub-carriers, and fluctuates in accordance with a Rayleigh distribution as time passes, so that each cub-carrier assumes various values continuously. However, they indicate attenuation by the distance to the power of 2.5 to 3.5 when an average electric power of all the sub-carriers is observed for a relatively long time.

Therefore, from the average electric power of all the sub-carriers, zones as mentioned above can be delimited. With regard to the time for observing the average of all the sub-carriers, it varies depending on the movement speed of terminals assumed in the system and the radius of the cell, so that it is determined by a value when electric dispersion is settled to be several dB.

In the following, a radio communication system according to a fifth embodiment of the invention is described.

Figure 8:
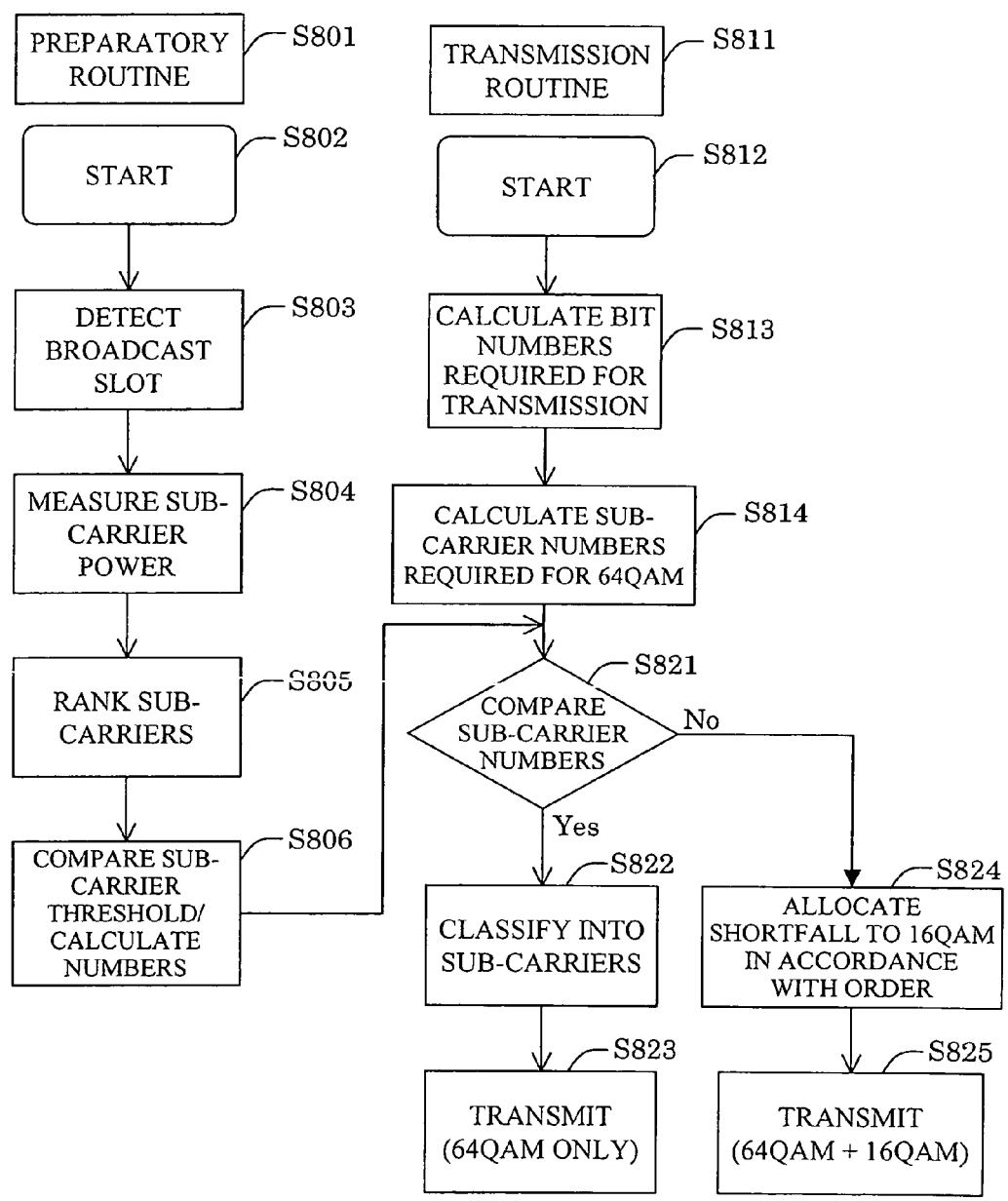
FIG. 8 shows a flow chart of the process on the transmission side according to another embodiment of the radio communication system of the invention.

In the first to the fourth embodiments as mentioned above, selections are made on the basis of a modulation method and required power for a best effort. In contrast, depending on a system, there are cases where volume required for a minimum transmission is fixed. In some cases, a guaranteed bandwidth is determined to be a minimum of 2 Mbps. FIG. 8 is a flow chart showing the flow of process in this case.

In the fifth embodiment of the present invention, the electric power of each sub-carrier is measured and then ranked. If the minimum value is achieved by the number of sub-carriers that exceed a threshold, the maximum communication volume is a communication volume that can be transmitted by the sub-carriers that exceed the threshold. In contrast, if the minimum value is not achieved by the number of the sub-carriers that exceed the threshold, the sub-carriers are selected in descending order of power strength even if they does not achieve the threshold, and then used until the minimum transmission volume can be sent.

In the following, each step is specifically described in order with reference to FIG. 8.

As shown in FIG. 8, a preparatory routine S801 is initiated in step S802. Broadcast slots are detected in step S803. The electric power of sub-carriers is measured in step S804. On the basis of the measured power, sub-carriers are ranked in descending order of power strength in step S805. The threshold of the sub-carriers is compared in step S806, and then the number of the sub-carriers that can be sent using 64QAM is calculated.

Meanwhile, a transmission routine S811 is started in step S812. The number of bits of data necessary for transmission is calculated in step S813. The number of sub-carriers necessary for transmission using 64QAM, for example, is calculated in step S814. The number of sub-carriers can be readily obtained from the number of bits since one sub-carrier indicates six bits.

The number of sub-carriers calculated in step S806 and the number of sub-carriers calculated in step S814 are compared in step S821. If the number of sub-carriers calculated in step S806 exceeds the number of sub-carriers calculated in step S814, all the sub-carriers are classified into 64QAM transmission in step S822, and then transmitted using only 64QAM in step S823 since all the sub-carriers can be transmitted using 64QAM.

In step S821, if the number of sub-carriers calculated in step S806 does not exceed the number of sub-carriers calculated in step S814, the shortfall is allocated to 16QAM in accordance with order assigned on the basis of reception power in step S824, and then transmission is performed using 64QAM and 16QAM since all the sub-carriers cannot be transmitted using 64QAM.

Namely, with respect to sub-carriers that do not achieve the threshold obtained in step S806, the modulation level of a modulation method must be inevitably small, so that the next threshold (64QAM is changed to 16QAM, for example) is used as a setting value for that amount.

Also, by limiting output as shown in FIG. 5(A), the output of sub-carriers whose reception power is highly ranked can be lowered, so that interference to other stations can be reduced while ensuring a guaranteed bandwidth.

In the following, a radio communication system according to a variation of a fifth embodiment of the invention is described with reference to FIG. 9. In the radio communication system according to the variation example, control is carried out so as not to transmit signals intentionally, while a threshold is achieved.

In some cases where the volume of signal information is asymmetric (cases where data volume differs in transmission and reception, for example) as on the Internet, depending on a signal such as ACK (Acknowledgement) and NAK (Negative Acknowledgement), a small amount of bits may be sent to an up channel (uplink) connecting from a mobile station to a base station. In these cases, interference can be reduced by refraining from transmitting unnecessary sub-carriers.

In this case, control is also carried out in order to transmit sub-carriers only as many as necessary in descending order of good propagation characteristics, using data previously ranked in accordance with electric power, and not to transmit the other sub-carriers, thereby further reducing interference. In addition, instead of making a selection only on the basis of the propagation characteristics, it is possible in individual terminals to determine the priority of sub-carriers that are used and to rank them by electric power, as another method for selecting the sub-carriers.

When ranking is made only on the basis of the propagation characteristics, it is not likely that each terminal MT is in the same propagation conditions. However, when communicating using only those sub-carriers that are independently measured and ranked, many terminals MT might use specific sub-carriers since no limitation is placed.

In such a case, the case where all the terminals MT might select the same sub-carriers can be avoided in each terminal by using a ranking of propagation paths and information on prioritized sub-carriers allotted to by a direction of an access point AP or on production of terminals.

In this case, if sub-carriers determined to exceed a threshold and required volume of transmission are within the sub-carriers allotted to by an allotment limitation, communication ends within the range. However, if communication would not end within the allotted range, communication is performed using a second allotment.

The control method is described with reference to FIG. 9.

Figure 9:
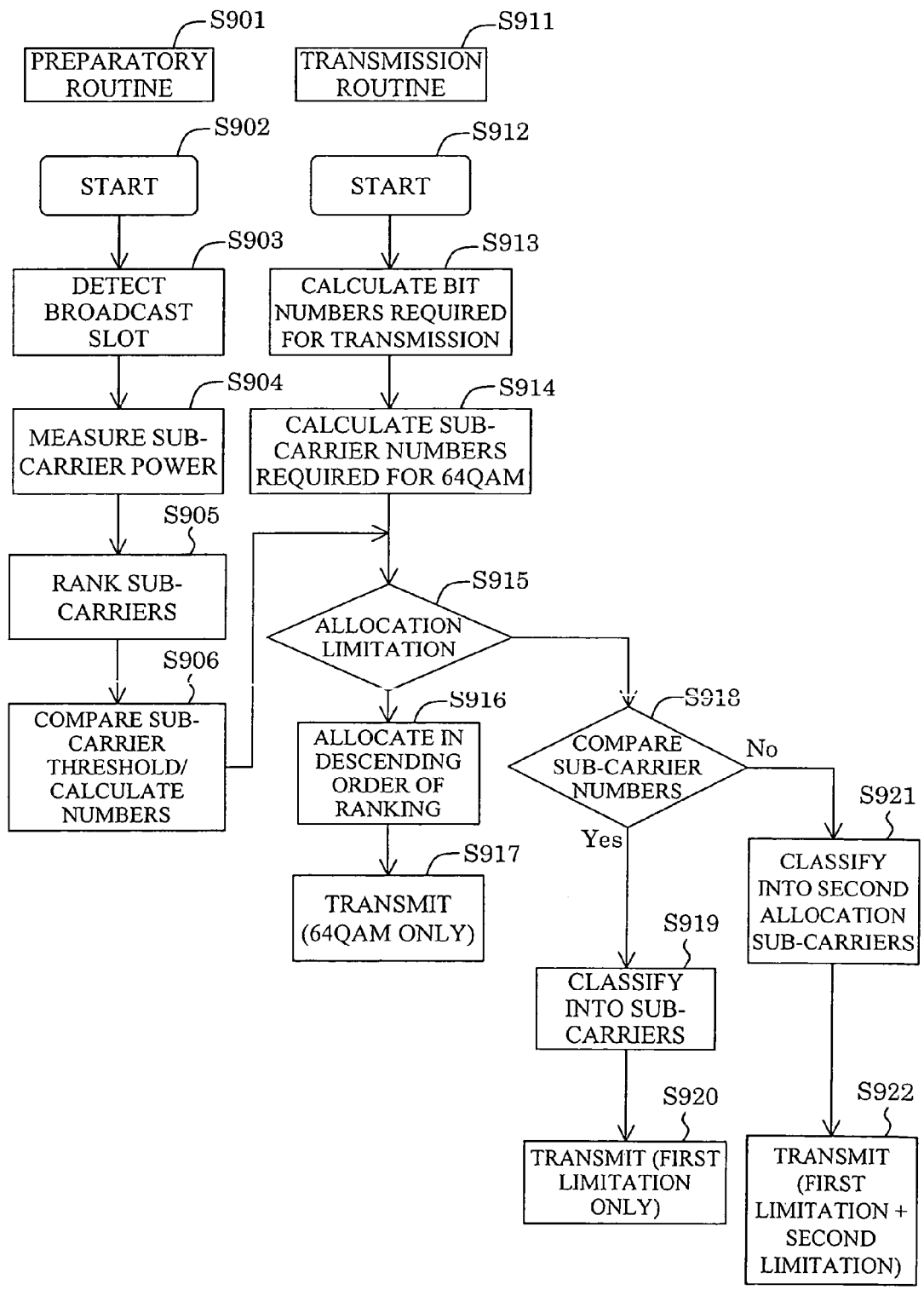
FIG. 9 shows a flow chart of the process on the transmission side according to another embodiment of the radio communication system of the invention.
Figure 10:
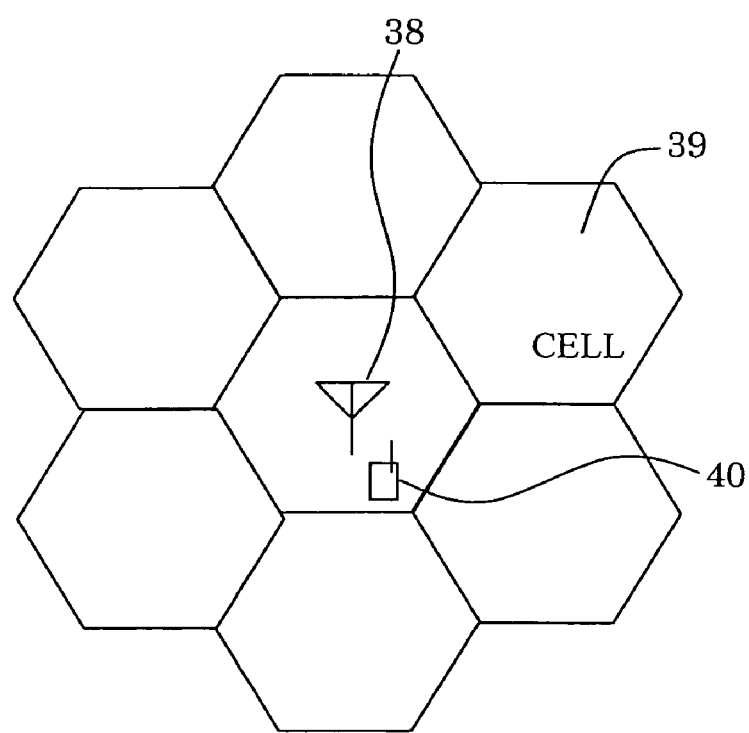
FIG. 10 shows a general concept of a cellular system.
Figure 12:
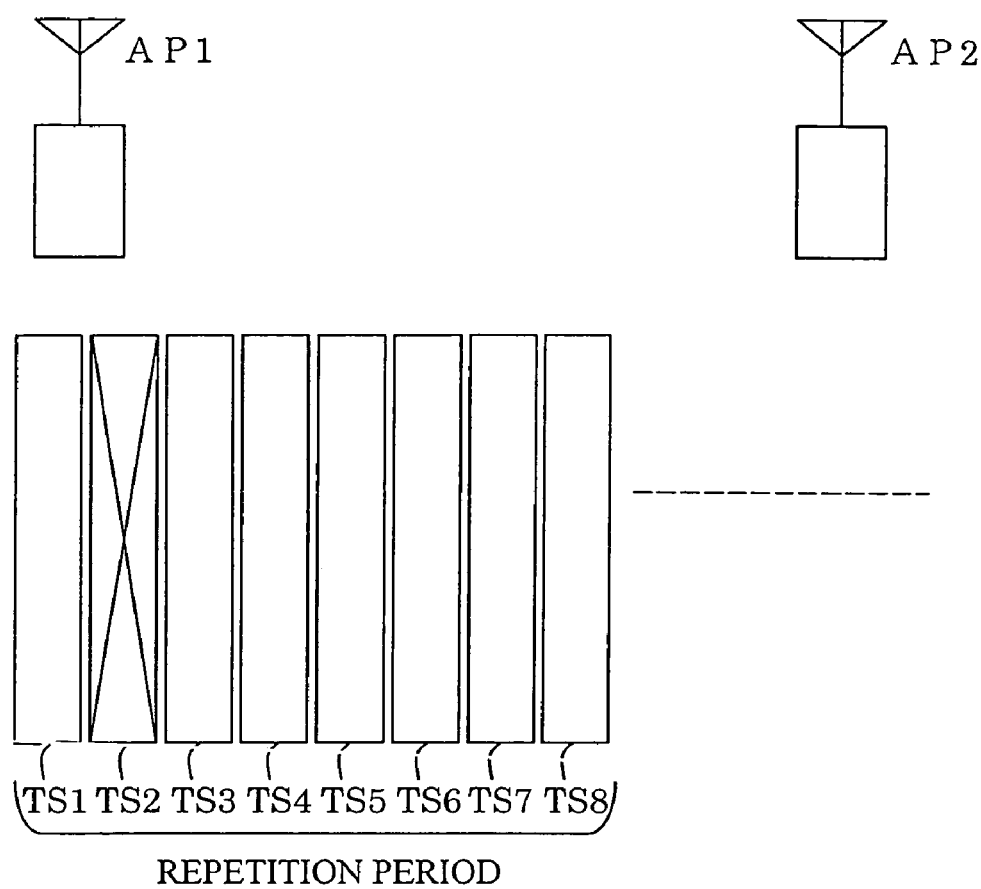
FIG. 12 shows the usage of time slots in the TDMA method.

A shown in FIG. 9, a preparatory routine S901 is initiated in step S902. Broadcast slots are detected in step S903. The electric power of sub-carriers is measured in step S904. On the basis of the measured electric power, sub-carriers are ranked in descending order of power strength in step S905. The threshold of the sub-carriers is compared in step S906, and then the number of the sub-carriers that can be sent using 64QAM is calculated.

Meanwhile, a transmission routine S911 is started in step S912. The number of bits of data required for transmission is calculated in step S913. The number of sub-carriers required for transmission using 64QAM, for example, is calculated in step S914.

Whether to limit a sub-carrier allotment or not is determined in step S915. If the sub-carrier allotment is not to be limited, the process advances to step S916 and the sub-carriers are allotted in descending order of the ranking. Transmission is performed using only 64QAM in step S917. In addition, if small amount of data volume is assumed, a determination step of step S821 shown in FIG. 8 can be omitted.

In step S915, if limitation allotment on grouped sub-carriers is to be made, the process advances to step S918. In step S918, the number of cub-carriers is compared as described in detail later. If the sub-carriers can be allotted sufficiently within one group that is grouped, the sub-carriers are allotted in step S919, and transmission is performed using only the first limitation in step S920.

In step S918, if the sub-carriers cannot be allotted sufficiently within one group that is grouped, the process advances to step S921. The sub-carriers are allotted to the second sub-carrier allotment, and transmission is performed based upon the first and the second limitation in step S922.

In order to describe the aforementioned steps more specifically, especially with regard to a grouping method, it is assumed that the number of all the sub-carriers is 128, each 32 sub-carriers are grouped leading to 4 groups in total, and priority is set in each terminal MT, for example.

In a preparatory routine, 60 sub-carriers of the 128 sub-carriers exceed a threshold and are prepared as being capable of multiple-value transmission.

In this status, when data corresponding to 5 sub-carriers is to be transmitted as a transmission signal, if there are 5 sub-carriers among the 60 sub-carriers in the first-prioritized 32 sub-carriers allotted to the immediate terminal MT, transmission is performed using the 5 sub-carriers. However, if there are less than 5 sub-carriers that exceed the threshold, the second-prioritized sub-carriers are used.

By such controlling, the effect of frequency division can be readily obtained and might be effective in homogenization of electric power within a band.

As described above, the radio communication system according to each embodiment of the invention can reduce interference to other stations to a minimum, and a line capacity, which has been a problem of a one cell frequency reuse system using TDMA, can be obtained by a large amount. This is because the amount of noise can be reduced statistically by controlling time-divided timeslots of TDMA in an OFDM sub-carrier level, resulting in suppression of an interference wave on a frequency axis. Moreover, interference power per bit of transmission information can be minimized.

Also, the radio communication system according to the embodiments of the invention controls a transmission output and multiple-value modulation methods in view of the positional relationship of a terminal in a cell, or the effect on adjoining cells. Therefore, interference to the adjoining cells can be constant, so that interference suppression is possible regardless of the terminal location.

In addition, transmission can be performed efficiently and with less interference not only by determining all the sub-carriers in a binary manner using the threshold, but also by ranking them, even when required volume of transmission data cannot be sent using only a maximum modulation level or when the volume of transmission data is small.

Further, the criteria of sub-carrier control can be obtained individually by using means for notifying a counterpart of a measurement result. Consequently, the radio communication system according to the embodiment of the invention can be used not only for reception power (C), but also for control using a ratio to interference power (C/I) and for a case where frequencies differ in transmission and reception, thereby improving a line capacity.

A coding rate may be used for modulation instead of a modulation level.

Although the present invention is described using the embodiments as above, the present invention is not limited to them. It is obvious to a person skilled in the art that various modifications, improvement, and combinations are possible.

INDUSREIAL APPLICABILITY

Interference to other stations can be reduced to a minimum, and a line capacity, which has been a problem of a one cell frequency reuse system using TDMA, can be obtained by a large amount by using the present invention.

Also, interference to adjoining cells can be constant, so that interference suppression is possible regardless of an MT location by controlling a transmission output and multiple-value modulation methods, in view of the positional relationship of the MT in a cell, or the effect on the adjoining cells.

Further, transmission can be performed efficiently and with less interference by ranking all sub-carriers on the basis of the electric power even when required volume of transmission data cannot be sent using only a maximum modulation level or when the volume of transmission data is small.

The invention claimed is:

1. A TDMA radio communication system using a multiple sub-carrier modulation method, said TDMA radio communication system, comprising:
at least a first and a second radio station, wherein
said second radio station selects only those sub-carriers capable of providing a transmission rate not less than a predetermined value in said first radio station, on the basis of the reception conditions of each sub-carrier of said first radio station, and modulates the selected sub-carriers using a modulation level or a coding rate in accordance with the reception conditions of said sub-carriers and also in accordance with the position of said first radio station with respect to said second radio station so as to perform communication.

2. The TDMA radio communication system according to claim 1, further comprising an output adjusting circuit for adjusting a transmission power value on an individually received sub-carrier unit basis.

3. The TDMA radio communication system according to claim 1, wherein said transmission rate not less than said predetermined value is a maximum transmission rate.

4. A TDMA radio communication system according to claim 1, wherein in the case where one of radio stations, which is a base station, supports a plurality of transmission rates not less than the transmission rate of another radio station which is terminal station, which rate is set the base station, said base station controls multiple transmission rates for individual sub-carriers in accordance with the reception conditions of each sub-carrier returned from said terminal station, using a greater number of types of modulation methods or coding rates not less than is set.

5. A TDMA radio communication system according to claim 1, wherein the transmission rate which can be supported by the base station is transmitted from the base station to the terminal station.

6. A TDMA radio communication system according to claim 1, further comprising a transmission sub-carrier selecting circuit which selects at least one group of sub-carriers within a frequency band based on the characteristics of the independence of sub-carriers that can be maintained as a result of processing of FFTs (Fast Fourier Transforms).

7. A TDMA radio station according to claim 6, wherein said frequency band is determined such that sub-carriers with reception powers are obtained so that communication is performed at the maximum transmission rate supported by said first radio station.

8. A TDMA radio communication system using a multiple sub-carrier modulation method, said TDMA radio communication system, comprising:
at least one base station and a terminal station, wherein
said base station selects only those sub-carriers capable of providing such a transmission rate not less than a predetermined value in said terminal station, on the basis of the reception conditions of each sub-carrier of said terminal station, and modulates the selected sub-carriers using a modulation level or a coding rate allotted in accordance with the reception conditions of the selected sub-carriers and the position of said terminal station with respect to said base station so as to perform communication.

9. The TDMA radio communication system according to claim 8, wherein a smaller modulation level or a coding rate is allotted to said terminal station in proportion as the distance increases between said base station and said terminal station.

10. The TDMA radio communication system according to claim 8, wherein said modulation level or said coding rate is allotted to said terminal station in each of a plurality of radio environment zones delimited on the basis of the relationship between power of interference to peripheries caused by communication between said base station and said radio station and the distance between said base station and said radio station; and the relationship between electric power required for communication between said base station and said radio station and the distance between said base station and said radio station.

11. The TDMA radio communication system according to claim 8, wherein said base station further comprises calculation means for calculating a transmission rate, in accordance with said terminal station's position with respect to said base station in a first cell area, such that interference power to a second cell area is not more than a predetermined value, said second cell area being different from said first cell area wherein said base station performs communication with said terminal station and in which second cell area another base station different from said base station and a terminal station perform communication.

12. The TDMA radio communication system according to claim 8, wherein said TDMA radio communication system further comprises memory means for storing information on each received sub-carrier ranked on the basis of the reception power, and wherein transmission is performed in descending order of reception power in accordance with the ranking.

13. The TDMA radio communication system according to claim 12, wherein transmission is performed in descending order of the modulation level or the coding rate.

14. A TDMA radio communication system using a multiple sub-carrier modulation method, said TDMA radio communication system, comprising:
   at least one base station and a terminal station that perform communication, wherein
   said base station selects only those sub-carriers capable of providing a transmission rate not less than a predetermined value in said terminal station, on the basis of the reception conditions of each sub-carrier of said terminal station, and modulates the selected sub-carriers using a modulation level or a coding rate allotted in accordance with the reception conditions of the selected sub-carriers and the position of said terminal station with respect to said base station so as to perform communication.

15. A second radio station suitable for a TDMA radio communication system using a multiple sub-carrier modulation method and comprising:
   at least a first radio station and said second radio station, wherein
   said second radio station selects only those sub-carriers capable of providing a transmission rate not less than a predetermined value in said first radio station, on the basis of the reception conditions of each sub-carrier of said first radio station, and modulates the selected sub-carriers using a modulation level or a coding rate in accordance with the reception conditions of the selected sub-carriers and also in accordance with the position of said first radio station with respect to said second radio station so as to perform communication.

16. A base station suitable for a TDMA radio communication system using a multiple sub-carrier modulation method and comprising:
   at least one base station and a terminal station, wherein
   said base station selects only those sub-carriers capable of providing a transmission rate not less than a predetermined value in said terminal station, on the basis of the reception conditions of each sub-carrier of said terminal station, and modulates the selected sub-carriers using a modulation level or a coding rate allotted in accordance with the reception conditions of the selected sub-carriers and the position of said terminal station with respect to said base station so as to perform communication.

* * * * *